United States Patent [19]

Reinhardt et al.

[11] Patent Number: 5,258,676
[45] Date of Patent: Nov. 2, 1993

[54] DRIVE UNIT FOR DOUBLE FAN

[75] Inventors: Wilhelm Reinhardt, Schrozberg-Gutbach; Werner Müller, Mulfingen-Seidelklingen, both of Fed. Rep. of Germany

[73] Assignee: ebm Elektrobau Mulfingen GmbH & Co., Fed. Rep. of Germany

[21] Appl. No.: 880,238

[22] Filed: May 8, 1992

[30] Foreign Application Priority Data

May 11, 1991 [DE] Fed. Rep. of Germany ....... 4115485

[51] Int. Cl.[5] .............................................. H02K 7/20
[52] U.S. Cl. ................................... 310/112; 310/67 R
[58] Field of Search ............... 310/112, 66, 67 R, 156, 310/254, 258, 261

[56] References Cited

U.S. PATENT DOCUMENTS

| | | | |
|---|---|---|---|
| 2,700,343 | 1/1955 | Pezzillo | 310/112 |
| 2,976,352 | 3/1961 | Atalla et al. | 230/117 |
| 3,083,893 | 4/1963 | Dean et al. | 230/117 |
| 3,175,755 | 3/1965 | Rockafield | 230/117 |
| 4,010,716 | 3/1977 | Minka | 123/8.47 |
| 4,571,528 | 2/1986 | McGee et al. | 310/156 |
| 4,612,468 | 9/1986 | Sturm et al. | 310/67 R |

FOREIGN PATENT DOCUMENTS

| | | | |
|---|---|---|---|
| 0100078 | 2/1984 | European Pat. Off. | 310/112 |
| 0273482 | 7/1984 | European Pat. Off. | 310/112 |
| 0310391 | 4/1989 | European Pat. Off. | 310/112 |
| 0447257 | 9/1991 | European Pat. Off. | 310/112 |
| 1198955 | 8/1965 | Fed. Rep. of Germany | 310/112 |
| 1428063.8 | 11/1968 | Fed. Rep. of Germany | 310/112 |
| 1538901.2 | 12/1969 | Fed. Rep. of Germany | 310/112 |
| 2732763 | 1/1979 | Fed. Rep. of Germany | 310/112 |
| 363119 | 8/1962 | Switzerland | 310/112 |
| 658299 | 12/1978 | Switzerland | 310/112 |
| 1199497 | 7/1970 | United Kingdom | 310/112 |

Primary Examiner—Steven L. Stephan
Assistant Examiner—Matthew Nguyen
Attorney, Agent, or Firm—Jones & Askew

[57] ABSTRACT

The invention relates to a drive unit for a double fan consisting of two external rotor motors (1, 2) arranged alongside each other on a common motor shaft (3), wherein the external rotor motors (1, 2) are arranged with respect to each other in such a way that the poles of the stators (12) of the two motors (1, 2) and the poles of the rotors (7) of the two motors lie in mirror image symmetry with respect to each other with reference to a dividing plane X—X running between the two external rotor motors (1, 2) at right angles to the motor shaft (3).

8 Claims, 2 Drawing Sheets

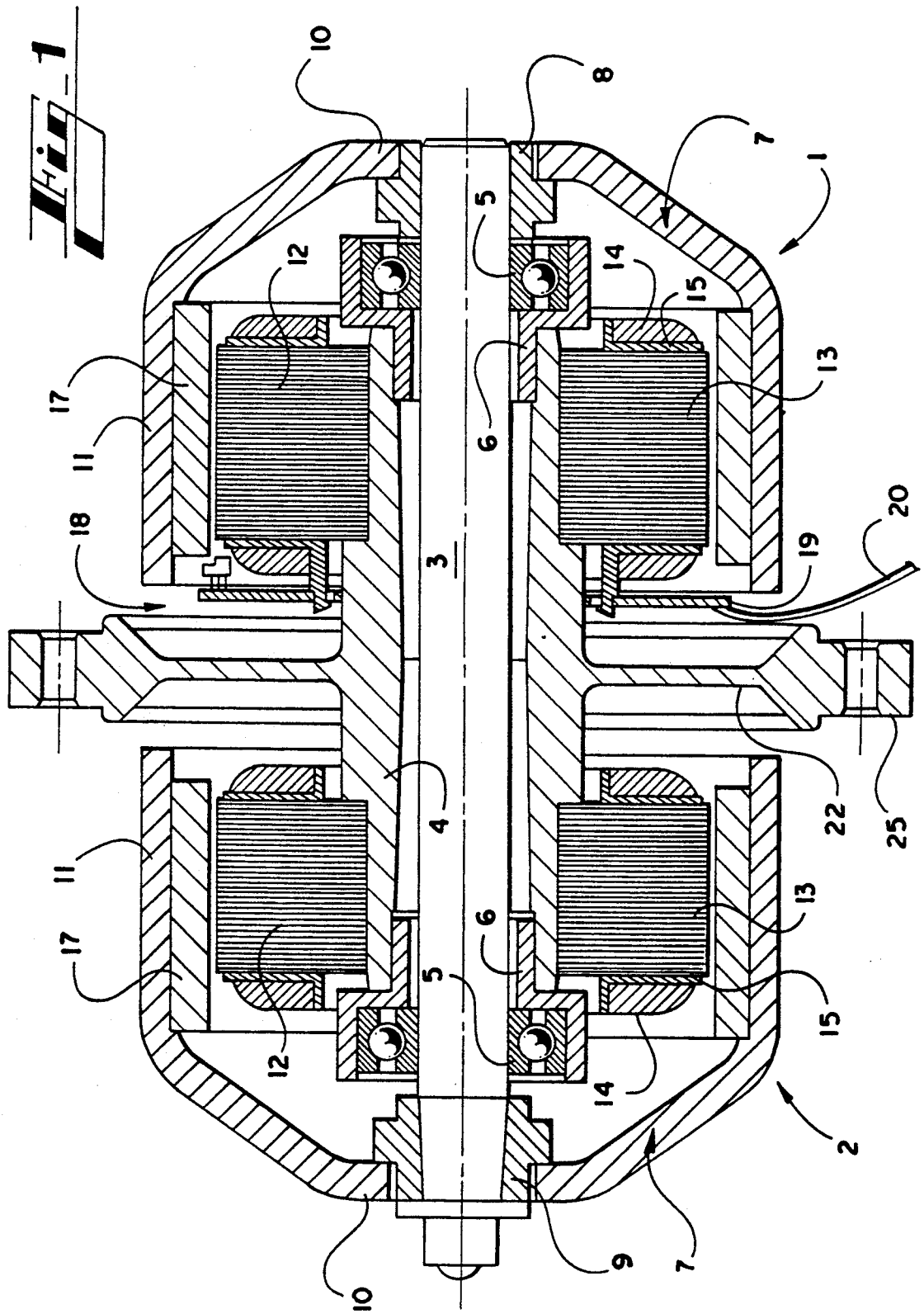

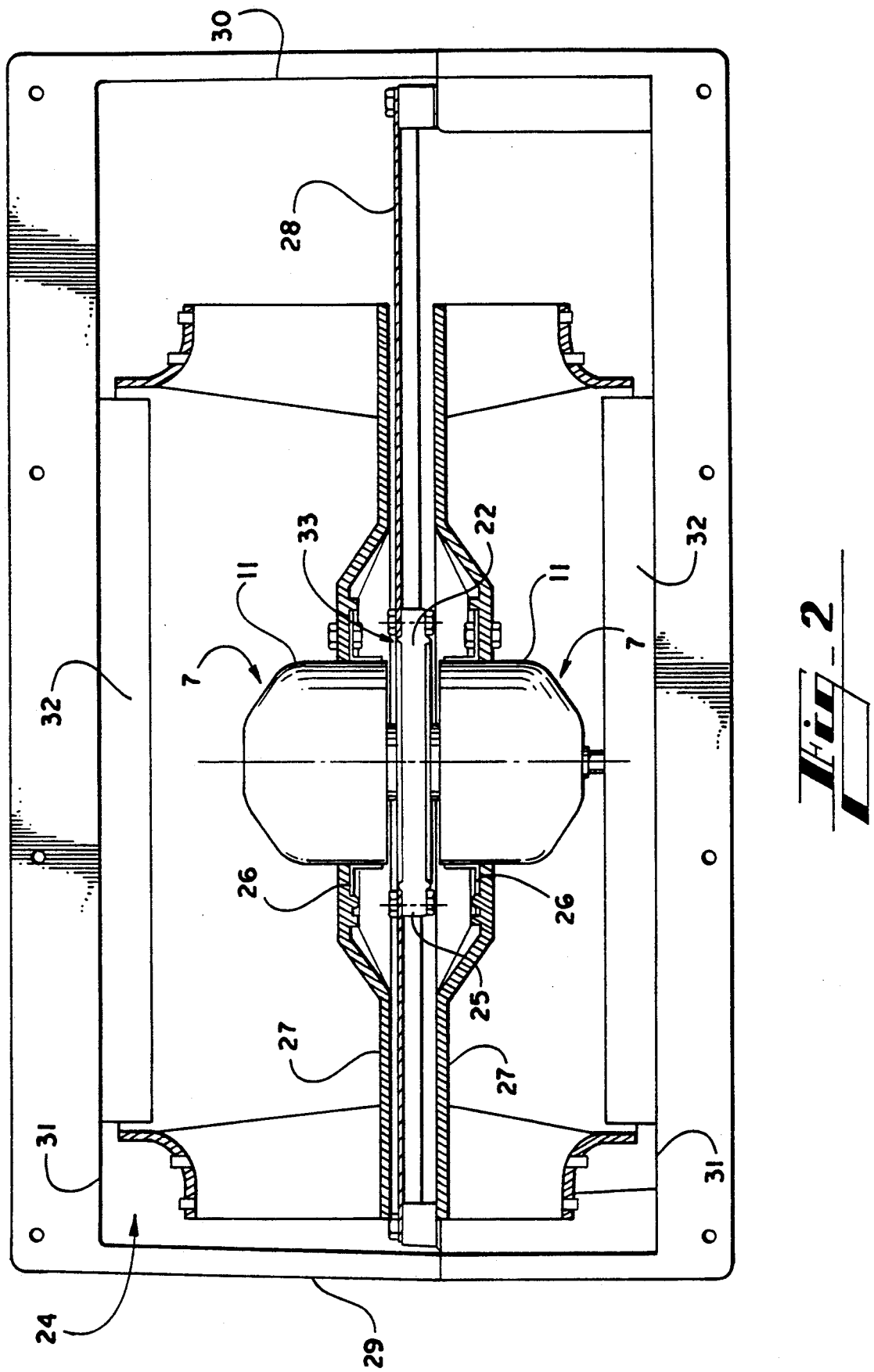

DRIVE UNIT FOR DOUBLE FAN

This invention relates to a drive unit for a double fan.

DE-OS 15 38 901 discloses a drive for devices with several rotation speeds in which the two electric motors are included together with a common mounting in a unit provided with a common output shaft and the rotors of the motors are constructed as external rotors. This drive unit can thus drive e.g. the washing drum of a washing machine at four different rotation speeds even though the motor is designed for two rotation speeds. It provides an economical and compact construction for the drive unit.

In the case of drives for double fans, i.e. fans with two separate impellers, the driving motor must have a relatively large power and therefore large motor dimensions. Large motor dimensions however reduce the cross-section available for the intake of air for given fan dimensions, so that high rotation speeds must be used. The consequences are a relatively poor efficiency, reduced service life and increased manufacturing costs. In addition to this, when a single motor is used, there is no uniform distribution of the air stream to the two impellers because of the asymmetries brought about by the motor fastenings on one side. If two separate motors are used to drive the two impellers of a double fan then these two motors must be synchronised electronically, and this likewise results in an increased investment in circuitry. The drive unit disclosed in DE-OS 15 38 901 is unsuitable for driving double fans, since it is not possible to drive the output shaft by both motors at the same time.

The object of this invention is to provide a drive unit for a double fan which is both compact and economical to manufacture and also has two motor units which both run in absolute synchronism.

In accordance with the invention a drive unit for double fans comprises two external rotor motors located alongside each other on a common motor shaft in such a way that the external rotor motors are arranged together so that the poles of the stators of the two motors and the poles of the rotors of the two motors lie in mirror image symmetry to each other with reference to a dividing plane running between the two external rotor motors at right angles to the motor shaft. Through this arrangement of the drive unit in accordance with the invention the two drive motors can be provided with a smaller external diameter than would be the case if a single motor were used, so that the intake of air is improved. In addition to this the lengths of the windings for the individual motors are shorter than the windings of a single motor, with the result that the motors are easier to wind.

In addition, efficiency is improved in comparison with the use of a single motor, since heat can be removed more easily from the smaller motors. As a result of the improved heat removal the motor bearings run at lower temperatures, which results in a longer service life for the bearing system and therefore the motor. The investment in electronics is appreciably reduced in comparison with the use of two separate motors, as absolute synchronism can be achieved through the arrangement according to the invention without separate electrical control.

Further advantageous embodiments of the invention are included in the subsidiary claims.

The invention will now be more particularly described with reference to the embodiments illustrated in the appended drawings. These show:

FIG. 1 a longitudinal cross-section through a drive unit according to the invention.

FIG. 2 a partial cross-section through a double fan with a drive unit according to FIG. 1.

As may be seen from FIG. 1, a drive unit according to the invention comprises two external rotor motors 1, 2 which are mounted alongside each other on motor shaft 3. Hence motor shaft 3 runs through a common bearing mounting tube 4 for the two motors and is mounted at the ends in bearings 5, in particular ball races, secured in bearing mounting tube 4 by means of bearing bushes 6. The rotor 7 of one of motors 1, 2 is secured to the terminal ends of motor shaft 3 projecting beyond bearing mounting tube 4 by an interference and/or interlocking fit by means of a rotor bush 8. The right hand rotor bush 8 in FIG. 1 is here pressed onto the end of motor shaft 3, while left hand rotor bush 9 is releasably secured.

The two rotors 7 are constructed in a bucket-shape cross-section wherein rotor bushes 8, 9 are each secured to the base 10 of rotors 7. Rotors 7 have a surrounding rotor wall 11 which concentrically surrounds the stator 12 of motors 1, 2. Each of the stators 12 has a laminated stator core 13 and a stator winding 14. Stators 12 are fixed for example by means of pressure fitting, with their laminated cores 13 on bearing mounting tube 4. End discs 15 of an electrically insulating material are provided at the ends of stator laminated core 13. A radially magnetized strip-shaped permanent magnet 17 is secured to the inside of rotor wall 11 of rotors 7 and this has at least two opposite polarities, namely a north pole and a south pole. Magnetic segments can be used as an alternative. Stator winding 14 of each stator 12 is wound in such a way that at least two poles of opposite polarity can be formed within the stator. Advantageously a 6-pole rotor is used in combination with a three strand stator winding. A plane of symmetry or dividing plane X—X lies at right angles to motor shaft 3 between motors 1, 2 which lie alongside each other in a axial direction. This dividing plane X—X runs through a gap 18 lying between the motors. Stators 12 of the two motors 1, 2 and rotors 7 of the two motors 1, 2 are arranged together in such a way that their poles lie in mirror image symmetry with respect to dividing plane X—X, i.e. the pole of the stator of the motor 1 and the pole of the stator of motor 2 are in mirror image symmetry with respect to each other and dividing plane X—X and the pole of rotor 7 of motor 1 is in mirror image symmetry to the pole of rotor 7 of motor 2 with respect to dividing plane X—X. This symmetrical arrangement of the poles is maintained when motors 1, 2 are stationary and running so that the two motors run absolutely synchronously. In addition to this a printed circuit board 19 is located in gap 18 between the two motors, and this bears the sensors required to detect the rotor position and the circuits for the windings of the two stators. As a result of the configuration of the drive unit according to the invention only one set of control electronics is necessary so that a common voltage supply and control electronics are provided for the two motors. An electrical conductor 20 which is introduced into the drive unit via gap 18 is connected to printed circuit board 19.

In addition to this it can be seen from FIG. 1 that a securing flange 22 runs through gap 18 at right angles to motor shaft 3 and is integrally attached to bearing mounting tube 4. This securing flange 22 may consist of individual spaced radial spokes or a through flange plate with openings in places for the wires of the winding to pass through. In addition securing flange 22 has securing members 25 on its outside to secure the drive unit to a housing 24, see FIG. 2. As a result of this configuration in accordance with the invention the drive unit according to the invention is mounted in a housing without any problems because there is a balanced distribution on either side of the securing flange.

As shown in FIG. 2, securing brackets 26 are provided on the outside of rotor walls 11 of rotors 7. These securing brackets 26 can be shrunk on to the periphery of the rotor or secured by other means. Fan impellers 27 can be secured to securing brackets 26 in a known way. The scope of the invention also includes the direct attachment of these fan impellers to rotors 7.

As can be seen from FIG. 2, a fan housing 24 according to the invention comprises a central housing wall 28 and a left and a right housing wall 29, 30 and upper and lower housing walls 31, which incorporate air intake openings 32. These intake openings 32 are concentric with motor shaft 3. The size of intake openings 32 depends on the diameter of the fan impellers 27. Central wall 28, which effectively divides the housing into two halves, consists of a triangular sheet which is bent at its outer edges for reasons of stability, and which is secured to housing 24 in the vicinity of its edges. A central opening 33 is provided in central wall 28 in which motors 1, 2 are located on the securing flange in such a way that central wall 28 falls along the dividing plane X—X for the drive unit. The front and rear ends of fan housing 24 form two opposite air outlet openings which extend over the full height of the fan housing.

As will be seen from the above, this yields a very compact construction for a double fan and also allows the drive unit to be fitted without difficulty.

We claim:

1. Drive unit for a double ventilator including two electrical external rotor motors (1, 2) arranged side by side on a motor shaft (3), where the electrical external rotor motors (1, 2) each have a rotor and a stator and are each arranged with respect to each other so that the poles of the stators of the two motors (1, 2) and the poles of the rotors (7) of the two motors, respectively, lie in a mirror-symmetric configuration with respect to a separation plane (X—X) running between the two motors (1, 2) and perpendicular to the motor shaft (3), comprising in combination:

each of the stators (12) has at least one stator winding (14) forming at least two poles of opposing polarity in the respective stator (12);

the motor shaft (3) runs inside a bearing support tube (4);

the stators of the two motors (1, 2) have laminated cores that are rigidly attached to the support tube (4);

the separation plane (X—X) runs through a gap (18) between the two motors (1, 2);

a circuit board (19) for components of control circuitry of the two motors (1, 2) is located inside the gap (18); and a fastening flange (22) perpendicular to the motor shaft (3) is in the gap (18), the fastening flange being formed in one piece with the bearing support tube (4).

2. Drive unit according to claim 1, characterized in that at both sides of the motor shaft (3) the rotor of one of the motors (1, 2) is fastened with a connection by means of a rotor bushing (8, 9).

3. Drive unit according to claim 1, characterized in that the fastening flange (22) is selected from the group consisting of individual radial spokes spaced according to the circumference of the motor and a continuous flange plate with intermittently formed openings for wires extending to the windings.

4. Drive unit according to claim 1, characterized in that fastening elements (25) are formed on an outer side of the fastening flange (22) for fastening the drive unit to a housing (24).

5. Drive unit according to claim 1, characterized in that the rotors have housings (11) with an outer side to which fastening brackets (26) are provided, and fan impellers (27) are attached to the fastening brackets.

6. Drive unit according to claim 1, characterized in that the rotors have housings (11) with an outer side to which fan impellers (27) are directly attached.

7. Drive unit according to claim 1, characterized by a ventilator housing (24) holding the motors (1, 2) and having a central housing wall (28) and left and right housing walls (29, 30) as well as upper and lower housing walls (31), and air entry openings (32) formed in the upper and lower housing walls (31).

8. Drive unit according to claim 7, characterized in that the air entry openings (32) are arranged concentrically to the motor shaft (3) and that the central housing wall (28) divides the housing (24) into two housing halves, and the central housing wall (28) has a central opening (33), in which the motors (1, 2) are attached by the fastening flange (22).

* * * * *